April 10, 1962   V. KRUEGER   3,029,403
MAGNETIC CORE STRUCTURES
Filed May 23, 1958

INVENTOR.
VERNON KRUEGER
BY Roger W. Jensen

United States Patent Office 3,029,403
Patented Apr. 10, 1962

3,029,403
MAGNETIC CORE STRUCTURES
Vernon Krueger, St. Paul, Minn., assignor to Minneapolis-Honeywell Regulator Company, Minneapolis, Minn., a corporation of Delaware
Filed May 23, 1958, Ser. No. 737,239
2 Claims. (Cl. 336—219)

This invention relates generally to laminated magnetic core structures for use in transformers, motors, generators, etc. More specifically the invention pertains to a magnetic core structure having superior characteristics and to the method of making the core structures.

Magnetic core structures are laminated primarily to reduce eddy current losses and various prior art methods have been proposed to hold the laminations together in assembled relationship. One prior art method of bonding laminations in a core structure is to coat the individual laminations on both sides with a thermo-setting adhesive, assembling the required number of laminations in a stacked relationship, then placing the assembled stack into a press which simultaneously applies heat and axial pressure to the stacks. Generally the heat is applied to both the ends and the sides of the stack from the pressing means and accordingly the heat is transferred from the outside of the stack towards the inside. Due to the time lag for the heat to penetrate the stack there is a tendency for the thermo-setting adhesive between the outside laminations and their adjacent laminations to melt first, and then the thermo-setting material between the second and third laminations, and so on until all of the thermo-setting material has been liquefied. The sequential melting of the thermo-setting material causes an "accordion effect." This is the result of the simultaneous application of the heat and pressure to the stack with the result that the laminations tend to become pressed against their adjacent laminations with sufficient force so as to complete electric continuity between adjacent laminations and thus make the entire core subject to relatively high eddy current losses. In other words the process defeated its own purpose since the reason for going to the laminated core in the first place was to eliminate eddy current losses while the process per se tended to short out adjacent laminations so as to cause relatively high eddy current losses.

Furthermore, with the prior art techniques the actual permeability (flux carrying ability) of the completed laminated magnetic core structure was considerably under the calculated theoretical maximum value. The reason for this is believed in part to be caused by stresses set up in the laminations due to the shrinkage of the bonding material upon cooling from its melted state. It is well known, of course, that any stresses set up in the magnetic lamination will reduce its flux carrying ability.

The present invention has solved the above two problems in laminated magnetic cores, i.e., high current losses and relatively low permeability, by using as a fill material in the thermo-setting bonding agent a large number of spherically shaped non-conductive particles. Preferably the particles are spherical glass beads having a diameter of approximately 1½ mil (0.0015 inch). The present invention consists of coating each lamination with a layer of the mixture on both sides or faces, assembling the coated laminations in a stack, placing the stack in a holding fixture, and applying axial pressure and heat simultaneously. The stack temperature is raised to a point sufficient to permit the thermo-setting bonding agent to melt. The axial pressure on the stack tends to shift the laminations together, the spacing therebetween being determined by the diameter of the glass beads since the glass beads are not affected by the applied heat or pressure and thus serve as spacers to position one lamination generally parallel to its adjacent laminations. The glass beads serve as electrical insulators between adjacent laminations and thus very materially reduce the eddy current losses in the finished core. Further, the glass bead spaced laminated core has a much higher permeability than a core not having glass fill. The reason for this is not clearly known although it is believed to be a function of the adjacent laminations being held in a perfectly parallel relationship due to the glass beads being of a uniform diameter and also due to the glass beads relieving stresses in the laminations caused by shrinkage of the thermo-setting bonding material upon cooling from the curing point. To illustrate the merit of the present invention, the permeability of one group of glass-bead spaced cores was approximately 100% higher than a group of cores which were identical in all respects except that they had no glass bead spacers.

Accordingly, it is an object of the present invention to provide an improved laminated magnetic core structure.

Another object of this invention is to provide a laminated magnetic core structure which has lower eddy current loss characteristics and higher permeability.

These and other objects of my invention will be set forth more fully in and become apparent from a reading of the following specification and appended claims, in conjunction with the accompanying drawing in which:

Figure 1:
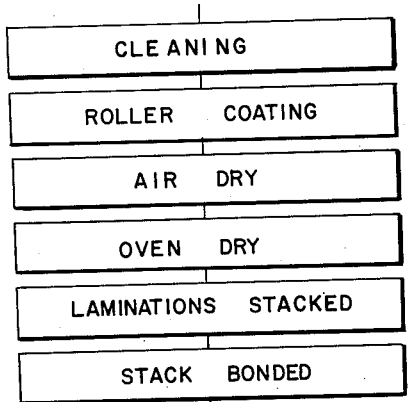
FIGURE 1 is a block diagram showing the various steps involved in fabricating a laminated magnetic core structure according to the present invention.
Figure 3:
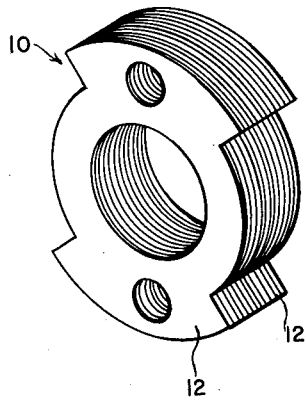
FIGURE 3 is an isometric view of a finished laminated magnetic core.

Referring to FIGURE 3, a rotor member for an electromagnetic device is generally identified by reference numeral 10. Rotor member 10 is fabricated out of a plurality of identically shaped laminations 12, the individual laminations 12 being bonded together by the process to be described below.

First the laminations are cleaned or degreased if necessary and then are coated on each face with a mixture of spherically shaped non-conductive particles and heat curing resinous material. Various formulations for the bonding means is contemplated by the present invention. One formulation that has worked out well is one using 98.5 (±2%) parts by weight of Cycleweld 55–9–100 cement which is adhesive and cohesive and which is manufactured by the Cycleweld Products Division of Chrysler Corp., Trenton, Mich. and 1.5 (±2%) parts by weight of spherically shaped glass beads having a nominal diameter of approximately 1 mil (0.001 inch). The glass beads can be obtained commercially from the Minnesota Mining and Manufacturing Company and have the designation Superbrite No. 119.

The glass beads are of a substantially uniform diameter which insures that the laminations 12 will be spaced apart uniformly in parallel relationship. It will be appreciated that the diameter of the glass beads is considerably less than the thickness of the laminations. This tends to keep the width or thickness of the finished core to a minimum. However, the process can be used with laminations that are relatively thin.

The glass beads are mixed into the Cycleweld cement and then applied to the faces of the lamination. Various means may be used for applying the coating of the mixture to the laminations. One method that has worked quite well is the use of a roller coating machine schematically shown in FIGURE 2. Here a pair of rollers 14 and 15 are mounted on suitable means, not shown, for rotation about their rotational axes 14' and 15', said axes being parallel to one another and spaced apart so that the peripheries of the rollers 14 and 15 come into close proximity with one another. The rollers 14 and 15 are positioned so that their lower portions project down into a pair of tanks or reservoirs 16 and 17. A sufficient quantity of the special mixture of the spherically shaped nonconductive particles and the heat curing resinous material above described is placed in each of the containers 16 and 17. The mixture is identified in FIGURE 2 by the reference numeral 20 and it will be observed that a sufficient quantity of the mixture 20 is placed in the containers 16 and 17 so that the lower portions of the rollers 14 and 15 are in contact with the mixtures.

Figure 2:
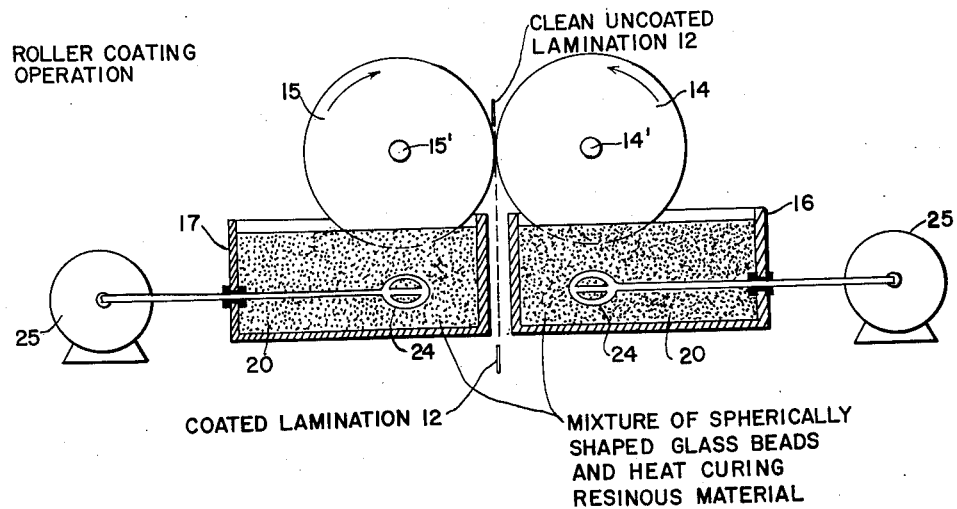
FIGURE 2 is a somewhat schematic diagram of a roller coating machine for coating the individual laminations.

The rollers 14 and 15 are caused to rotate by suitable means, not shown, such as an electrical motor for rotation in opposite directions about their axes 14' and 15' respectively. The sense of rotation of rollers 14 and 15 is indicated in FIGURE 2 by the arrows which indicate that as shown roller 14 is rotating in a counter clockwise direction and roller 15 is rotating in a clockwise direction. It will be appreciated that as the rollers 14 and 15 are rotated in the manner shown that they will pick up a certain amount of the mixture 20 from the reservoirs 16 and 17 on their peripheries.

The cleaned uncoated lamination 12 is inserted either manually or otherwise between the rollers 14 and 15 and is carried through the rollers due to the frictional engagement therewith at which time it is coated on its faces by the mixture 20 carried on the peripheries of the rollers. The thickness of the coating placed on the laminations will depend in part on the spacing between the axes 14' and 15' as well as upon the viscosity of the heat curing resinous material. When using spherically shaped glass beads having a nominal diameter of 1 mil I have found that an over-all thickness of the coating of the mixture 20 of 0.0015 to 0.002 inch is satisfactory.

Agitating means are provided in the reservoirs 16 and 17 to maintain the spherically shaped glass beads suspended in the heat curing resinous material. This is illustrated in FIGURE 2 by agitators 24 being driven by a motor means 25.

The coated lamination 12 is illustrated in FIGURE 2 falling down between the reservoirs 16 and 17 to a zone where they will be collected for the next step of the process which is the drying of the bonding agent. When using the above described formulation it has been found desirable to dry the coated laminations for one hour in air at room temperature and then to pass the coated laminations through an oven having a temperature of 170 degrees for 15 to 20 minutes.

Next the coated and dried laminations are stacked in an assembled relationship with the desired number of laminations being so assembled. The individual stacks are then placed in a suitable fixture which in turn is placed into a press which applies both axial pressure and heat. When using the above described specific formulation it is desirable to apply a temperature of approximately 350° Fahrenheit to the press and to apply an axial pressure of 50 to 200 pounds per square inch to the assembled stack, this process being continued for approximately 20 minutes.

The cores 10 are then completely bonded together with the spherically shaped glass beads in the bonding agent serving as a means for electrically insulating each lamination from its adjacent laminations. The glass beads do not fracture during the pressing operation due to their mechanical strength and also are not adversely affected by the temperature of the pressing operation. Further, the glass bead, being of a uniform diameter, tends to keep the individual laminations in the assembled stack in perfectly parallel relationship.

As above indicated, the finished laminated magnetic core structure 10 as produced by the present process is one having very low eddy current losses and a very high permeability as compared to prior art laminated core structure wherein adjacent laminations would tend to become electrically connected together during the pressing operation.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention. What I claim is:

1. A magnetic core structure composed of a plurality of laminations of magnetic material bonded together face to face by means including an adhesive disposed between adjacent laminations, said adhesive containing a filling material comprising a plurality of discrete electrically insulative solid particles characterized by being spherically shaped and all substantially of the same diameter, said diameter being substantially equal to the spacing distance between adjacent laminations, and each of said laminations being spaced apart and parallel to an adjacent lamination by a single-particle-depth layer of said spherical particles.

2. The magnetic core structure as described in claim 1 further characterized by said spherically shaped particles having a diameter substantially less than the thickness of the individual laminations.

References Cited in the file of this patent

UNITED STATES PATENTS

| | | |
|---|---|---|
| 1,629,311 | Ruder | May 17, 1927 |
| 2,221,983 | Mayer | Nov. 19, 1940 |
| 2,390,863 | Amidon | Dec. 11, 1945 |
| 2,778,762 | Eisler | Jan. 22, 1957 |
| 2,882,505 | Feder | Apr. 14, 1959 |

FOREIGN PATENTS

| | | |
|---|---|---|
| 595,402 | Great Britain | Dec. 4, 1947 |